Dec. 10, 1935.     G. A. KELLY     2,023,530
MEAT SKINNER
Filed May 19, 1934     2 Sheets-Sheet 1

INVENTOR
George A. Kelly,
BY Bernard J. Garvey
ATTORNEY

Dec. 10, 1935.  G. A. KELLY  2,023,530
MEAT SKINNER
Filed May 19, 1934  2 Sheets-Sheet 2
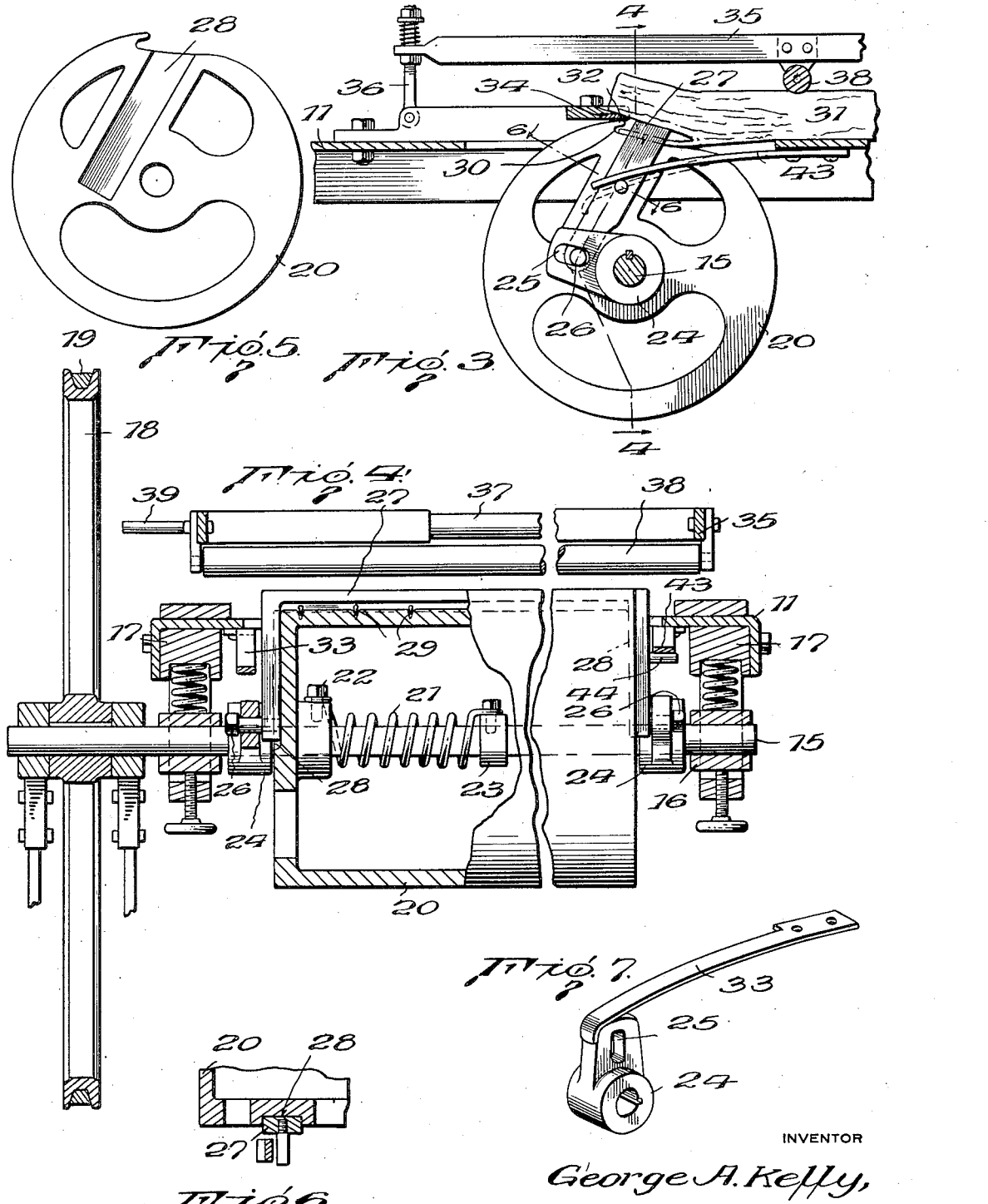
INVENTOR
George A. Kelly,
BY Bernard F. Gawley
ATTORNEY Patented Dec. 10, 1935

2,023,530

UNITED STATES PATENT OFFICE 2,023,530

MEAT SKINNER

George A. Kelly, Baltimore, Md.

Application May 19, 1934, Serial No. 726,553

4 Claims. (Cl. 146—130)

The present invention is an improvement over the meat skinner invention embodied in my co-pending application Serial Number 630,587, filed August 26th, 1932, to provide a more efficiently operating skinner with greater convenience of operation.

Objects of this invention are to provide a manually controlled meat presser roller which operates in conjunction with a motor control means for simultaneously imparting movement to a meat feeding drum at the same time that the presser roller engages the meat; to provide a power operated drum so mounted that movement of the power shaft will initiate meat impaling means on the drum preparatory to operating the latter; and to provide meat impaling means to positively hold the meat on the drum, the impaling means being automatically released from the meat at a predetermined point during the cycle of operation of the drum; the impaling means also being under the influence of a restraining spring during the time said means passes through the zone of the knife, to prevent contact thereof with the knife.

Many other objects of the invention will be apparent from the following description of the present preferred form thereof, taken in connection with the accompanying drawings, wherein Fig. 1 is a side elevational view of a meat skinner constructed in accordance with the present invention;

Fig. 3 is a detail, fragmentary, enlarged side elevational view of the skinner, illustrating the application of the same, portions of the skinner being shown in section to disclose details;

Fig. 4 is a vertical sectional view taken on the line 4—4 of Fig. 3, looking in the direction of the arrows, with the meat removed;

Fig. 5 is an end elevational view of the drum;

Fig. 6 is a detail, enlarged, fragmentary sectional view of the drum, illustrating the manner of mounting the pin-carrying impaling terminals therein; and Fig. 7 is a detail, perspective view of the drum retaining spring and shaft eccentric.

Figure 1:
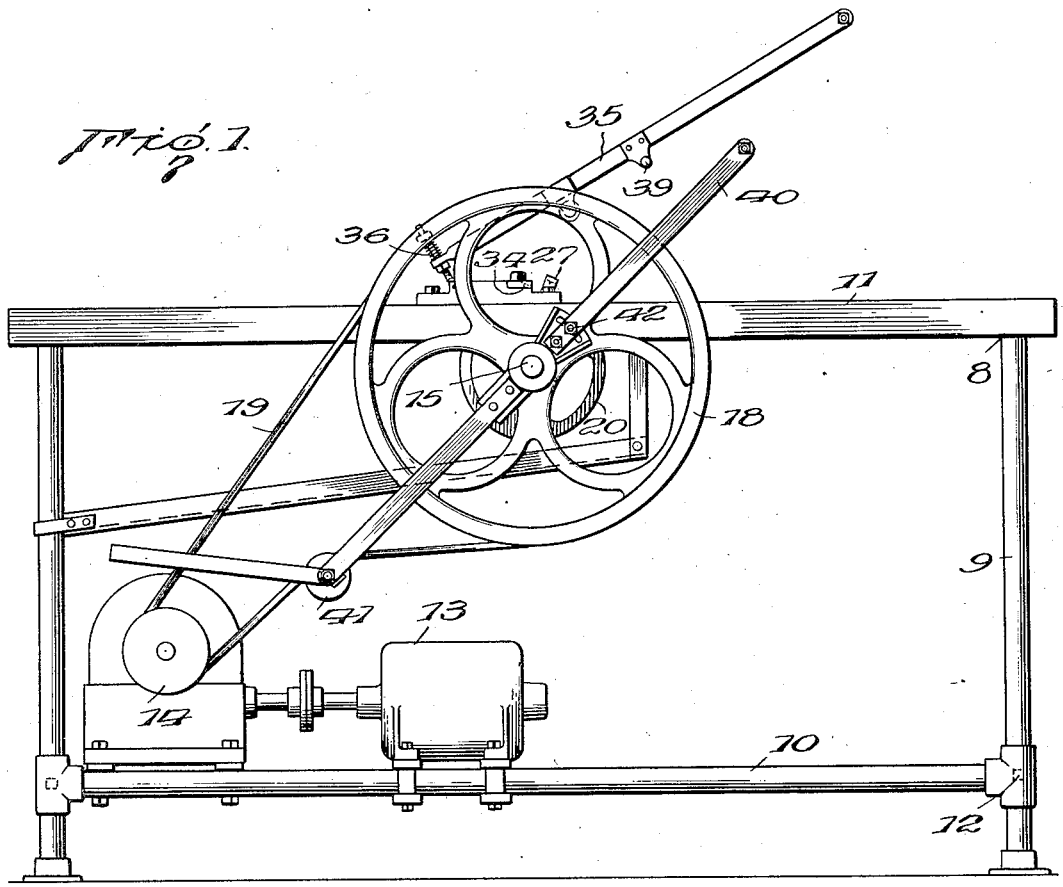
Figure 2:
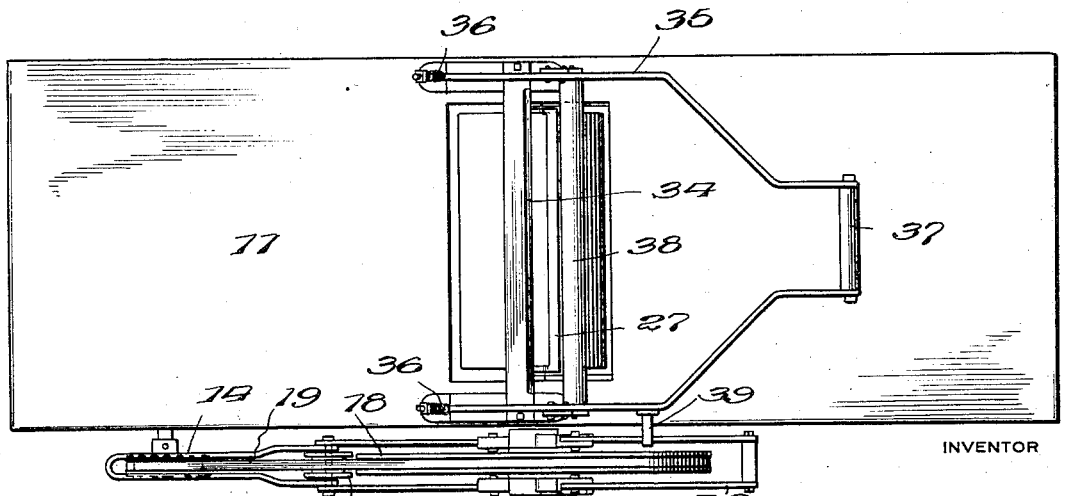
Fig. 2 is a top plan view thereof.

The device of the present invention includes a supporting structure which, in the present instance, is shown to consist of a table 8, preferably made of metal and including legs 9, braces 10, and top 11. The braces 10 are vertically adjustable on the legs 9 and may be held in any position of adjustment on the legs by set screws 12, or the like. The supporting structure is adapted to carry a power unit, generally designated 13, which may be of conventional design and includes a power pulley 14.

Mounted beneath the table top 11, approximately midway the ends thereof, is a shaft 15, the latter being mounted in bearings 16, yieldably mounted in brackets 17 supported from the table top. One end of the shaft projects beyond a side of the supporting structure 8 and is keyed to a grooved wheel 18, the latter having a belt 19 loosely trained thereabout. The belt 19 is also trained about the power pulley 14; consequently, power is in this manner transmitted from the power pulley to the shaft 15 when the belt is taut.

A hollow drum 20 is loosely mounted on the shaft 15 and is of a diameter which projects its periphery through an opening in the table top, as shown to advantage in Figs. 3 and 4. The drum is yieldably restrained from movement on the shaft 15 by suitable yieldable means which in the present instance, is shown to consist of a coil spring 21, sleeved on the shaft. One end of the spring is anchored to an internal hub on the drum, as indicated at 22, the opposite end being engaged with a collar 23, which is adjustably mounted on the shaft 15 within the drum. Keyed to the shaft 15 at each end of the drum 20, is an eccentric sleeve 24, the cam portion of which is provided with an elongated slot 25, which receives a bolt 26 carried by a meat impaling bracket 27. The terminals of the meat impaling bracket are mounted in recesses 28 formed in the ends of the drum. The inner face of the body portion of the bracket is provided with teeth 29, adapted to be mounted in complemental openings formed in the wall of a groove 30.

The meat to be skinned, such as bacon, shown in Fig. 3 of the drawings at 31, has a portion of its skin mounted in the groove 30, the latter having an overhanging lip 32 which serves as an abutment for the free end of the skin. The free end of the skin is automatically clamped to the drum by the impaling bracket 27, when motion is imparted to the shaft 15. It will be manifest that initial movement of the shaft 15 actuates the impaling bracket so as to secure the bacon to the latter. During this initial movement of the shaft, the drum remains immobile, by reason of the yieldable restraining means 21 and a flat restraining spring 33, which latter is secured to the table top and normally flexes downwardly for engagement, at times, with one of the eccentric sleeves 24, following which the drum and impaling bracket move as a unit.

A knife 34 is mounted in a suitable bracket on the top 11 of the supporting structure in such manner that the edge thereof overhangs the drum at a point paralleling the axis of the latter. The drum is fixed in the bracket and is adapted to pass in the bight formed at the entering end of the bacon, between the meat and skin, as shown in Fig. 3. Movement of the drum feeds the bacon over the knife.

It is desired to positively press the meat against the roller to insure an effective cutting operation and for this purpose, I employ a suitable manually operated frame 35, one end of which is mounted on swivel bolts 36 supported by the knife carrying bracket on the top 11. The opposite end of the frame is formed to provide a handle 37. At an intermediate portion on the frame, a meat presser roller 38 is journalled, the roller being of conventional design and impinging the meat in advance of movement of the latter over the drum 20.

The frame 35 serves also in the capacity of a starter lever for the drum in that it is equipped with an abutment pin 39, which projects laterally from the frame and is adapted to engage a motor control lever 40. The lever 40, in the present instance, is shown to be of U-shape construction, being pivotally mounted on the shaft 15 and being equipped with a belt tensioning roller 41. As the frame 35 moves downwardly, the pin 39 contacts the lever 40, causing the latter to move on its axis in order to bring the roller 41 into engagement with the drive belt 19 to tension the latter in a manifest manner. The lever 40 is adjustable, as indicated at 42, to permit the handle end of the lever to be raised or lowered.

In order to eliminate possibility of the impaling bracket 27 contacting the knife 34 during the cycle of operation of the drum 20, I provide a depressing means for the bracket which, in the present instance, is shown to consist of a flat spring 43, one end of which is secured to the top 11 of the supporting structure, the opposite end being adapted for engagement with a stud 44, which projects from one terminal of the bracket 27. It will be apparent that as the spring 43 wipes over the stud 44, the bracket will be urged in the direction of its groove in the drum 20.

Although I have described the preferred form of my invention herein, it is apparent that various changes may be made therein within the scope of the claims hereto appended.

What is claimed is:

1. A meat skinner including a supporting structure embodying a knife and a rotatable shaft, a drum mounted on the shaft for feeding the meat to the knife, a meat impaling bracket carried by the drum yieldable means engaging the shaft and drum whereby limited rotation of the shaft in advance of the drum is permitted, and means eccentrically connecting the shaft and impaling bracket for urging the impaling bracket into intimate contact with the drum immediately upon rotation of the latter.

2. A meat skinner including a supporting structure embodying a knife, a drum for feeding the meat to the knife, a manually controlled meat presser on the supporting structure, and power means on the structure in operative engagement with the drum, and power control means in the path of movement of the manually controlled meat presser to engage the latter and effect operation of the drum when said presser means contacts the meat.

3. A meat skinner which includes in combination, a supporting structure embodying a drum operated shaft equipped with a drum and means eccentrically engaged to said shaft and relatively movable with respect to the drum for securing the meat to the drum and a knife mounted on said structure, near the drum; mechanism on the structure in connection with the shaft to control movement of the latter, yieldable means connecting the drum and shaft to cause movement of the drum on the shaft within the limits of expansion of the spring to normally urge the meat securing means away from the drum periphery, and means on said structure to positively urge the meat securing means against the drum periphery during movement of said meat securing means against the knife.

4. In combination with a rotatable meat carrying drum, a knife for skinning the meat, mechanism, including a motor, for rotating the drum, means for engaging the meat with the drum, lever means for effecting driving connection between the motor and drum, a roller for impingement with the meat in advance of the drum, and means for manually urging the roller into contact with the meat and simultaneously engaging the lever means.

GEORGE A. KELLY.